June 3, 1930.                H. WEICHSEL                1,761,855
ELECTRIC CURRENT GENERATING APPARATUS
Filed July 8, 1927
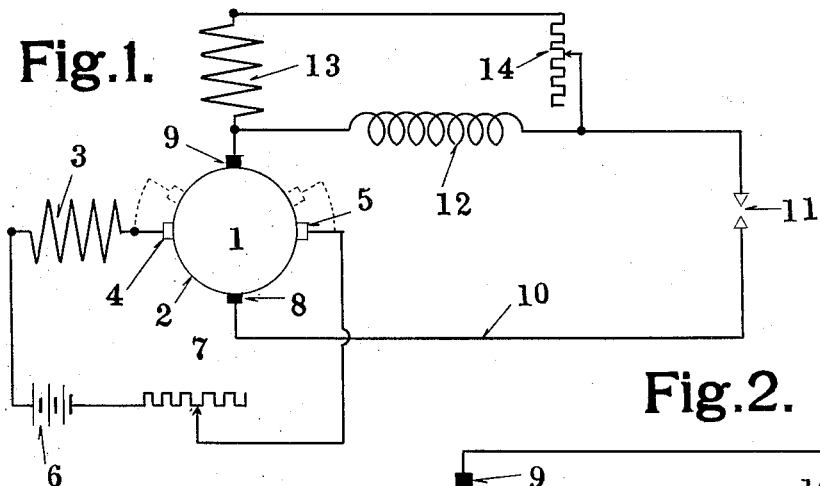
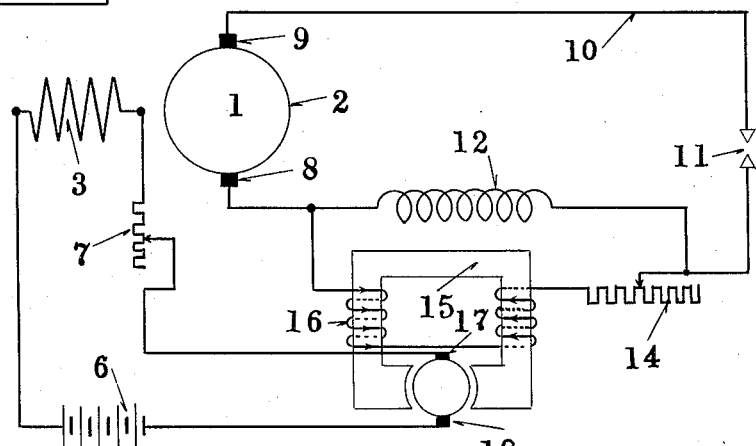
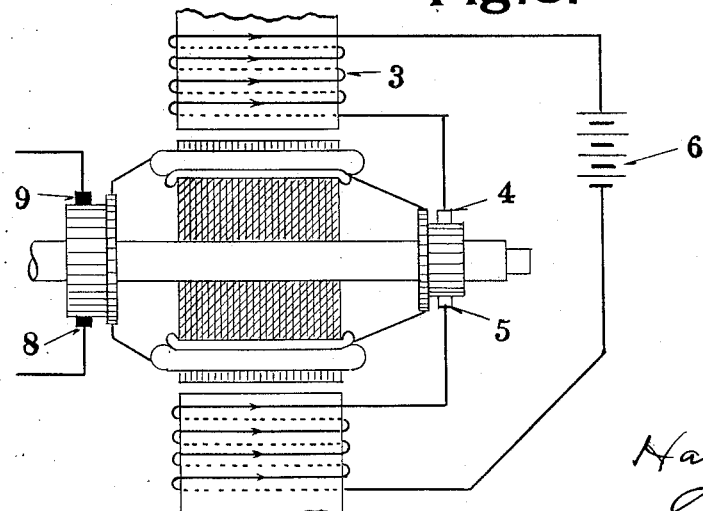
INVENTOR
Hans Weichsel
BY E. E. Huffman
ATTORNEY Patented June 3, 1930

1,761,855

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

ELECTRIC-CURRENT-GENERATING APPARATUS

Application filed July 8, 1927. Serial No. 204,169.

My invention relates to a current generating apparatus having the characteristics of automatically decreasing the voltage as the delivered current increases, one application of such apparatus being to furnish the current for an arc welding circuit. The reason for decreasing the generating voltage with increase of current in the arc circuit is well understood and it has heretofore been proposed to accomplish this result by decompounding means in the form of a multiplicity of windings per pole or by employing an additional set of poles. The object of my invention is to avoid the use of such windings and extra poles and to thereby secure a decreased size of the generator and decreased field losses.

In the accompanying drawings Figure 1 diagrammatically illustrates a current generating apparatus for the purpose mentioned, which embodies my invention; Figure 2 illustrates a modified form of apparatus; and Figure 3 a modification in the armature of the machine of Figure 1.

Referring to Figure 1, 1 represents a direct current generator having commuted winding 2 and field or exciting winding 3. A pair of brushes 4, 5, cooperating with the commuted winding, are in series circuit with exciting winding 3 and a source of constant potential 6 (shown as a storage battery) through adjustable resistance 7. The brushes 4, 5 are preferably disposed coaxially with the exciting winding 3 or along the line parallel to the axis of that winding, as indicated by dotted lines. A pair of brushes 8, 9 also cooperate with the commuted winding 2 and are displaced from the brushes 4, 5 preferably by an angle of substantially 90 electrical degrees. The arcing circuit 10 is connected to the brushes 8, 9, the arcing point being diagrammatically indicated at 11. I preferably include in this arcing circuit an inductance 12 and may provide the generator with a winding 13 located in the axis of the brushes 8, 9 and connected in the arcing circuit in parallel with the inductance 12 through adjustable resistance 14.

Referring to the operation of the apparatus of Figure 1, no voltage is generated across the brushes 4, 5 when the arcing circuit is open since their axis coincides with the axis of the exciting winding 3, and under this condition the excitation of the winding 3 is due solely to the substantially constant potential of the battery 6. When the arcing circuit is closed and current drawn from the brushes 8, 9, and armature flux is set up in the axis of these brushes which results in a voltage being generated in the armature conductors which appears at the brushes 4, 5. If winding 13 is employed it carries part of the output current, and the flux in the axis of the brushes 8, 9 may be increased or decreased depending upon the direction of connection of the winding. The direction of connection of the source of constant potential 6 to the brushes 4, 5 is such that the voltage generated in the armature and appearing at the brushes 4, 5 opposes the voltage impressed on the exciting circuit by the source of constant potential 6. Since the generated voltage appearing at brushes 4, 5 is proportional to the current through the arc circuit, the current through the winding 3 decreases with increasing arc current since the difference between the constant exciting voltage and the generated voltage appearing at the brushes 4, 5 decreases. Thus the desired result of decreased voltage at the brushes 8, 9 with increasing load current is attained. The voltage ampere characteristics of the arc circuit can be varied by shifting the brushes 4, 5. If it is desired to increase the short-circuit current without changing the no-load voltage at 8, 9, the brushes 4, 5 are so shifted as to maintain their axis in parallelism with the axis of the field winding 3. Placing the brush axis at an angle to the field winding axis alters both the no-load voltage and short-circuit current of the generator.

As is known, the function of inductance 12 is to prevent sudden changes in the total effective resistance of the arc circuit when the arc resistance suddenly changes. By placing the winding 13 in shunt to the inductance 12, I cause the machine to respond more quickly to current changes in the arc circuit because the circuit in the less inductive branch of the shunt will change more quickly than that in the branch containing the inductance 12.

With reference to the resistance and inductance values of the two branches of the shunt just referred to, it may be said that it is preferable that the time constant of the inductance 12 should be larger than that of the shunt including resistance 14 and winding 13.

Instead of having a single armature winding and single commutator, as indicated in Figure 1, I may provide the armature with two commuted windings, as shown in Figure 3, one of these windings being connected in the exciting circuit and the other in the load circuit. This arrangement enables me to so design the windings as to secure somewhat better commutation since it is then possible to provide the winding connected to the brushes 4, 5 with only a small number of turns.

Instead of securing the voltage proportional to the load current by means of brushes 4, 5 on the armature of the generator, I may secure this voltage from a small generator whose field winding carries the load current, and this modification is illustrated in Figure 2, in which the auxiliary generator 15 having field coil 16 has its armature connected in series with a source of constant potential 6 and the exciting winding 3 and in such direction that the generator voltage opposes the voltage of the source 6. The magnitude of the generator voltage may be varied by shifting the brushes 17, 18 from the neutral position shown in the drawings in such manner as to either change their angular relation to the field or their space displacement.

It will be understood that in lieu of a storage battery 6 the source of constant potential may, in the apparatus of either Figures 1 or 2, be a constant potential generator.

It will also be understood that a change in the voltage ampere characteristics of the arcing circuit may be made by shifting the brushes 8, 9 and also by changing the magnitude of the resistance 7 in the exciting circuit.

I am aware that modifications may be made in the apparatus herein described without departing from the principle of my invention and I do not therefore intend that its scope be limited other than by the appended claims.

Having fully described my invention, what I claim as new and desire to secure by Letters Patent of the United States is:

1. A direct current generator provided with an exciting circuit comprising an exciting winding and brushes, an output circuit comprising a set of working brushes displaced from the exciting brushes, an auxiliary winding on the generator displaced from the exciting winding and in circuit with the working brushes, and an inductance connected in the output circuit in shunt to said auxiliary winding.

2. A direct current generator provided with an exciting circuit comprising an exciting winding and brushes, an output circuit comprising a set of working brushes displaced from the exciting brushes, an auxiliary winding on the generator, an inductance in the output circuit, and a resistance, said auxiliary winding and resistance being connected in series and to the load circuit in shunt with the inductance.

3. The combination with an arcing circuit comprising an inductance, of a generator for supplying current to said circuit, and means for regulating said current comprising a winding connected in the arc circuit in shunt to the inductance and adapted to decrease the excitation of the generator upon the increase of current in that circuit, the time constant of the inductance branch being greater than that of the other branch.

4. The combination with an arcing circuit comprising an inductance, of a direct current generator for supplying current to said circuit, said generator being provided with an exciting circuit comprising an exciting winding and brushes and a source of constant potential, the elements of said circuit being so connected that the brush voltage opposes the voltage of said source, working brushes on the generator displaced from the exciting brushes, and an auxiliary winding on the generator displaced from the exciting winding and connected in the arc circuit in shunt to the inductance, the time constant of the inductance branch being greater than that of the other branch.

In testimony whereof, I hereunto affix my signature, this 2nd day of July, 1927.

HANS WEICHSEL.